US006871120B1

(12) United States Patent
Nivet (10) Patent No.: US 6,871,120 B1
(45) Date of Patent: *Mar. 22, 2005

(54) DEVICE FOR ACTUATING A SEAT ELEMENT AND SEAT COMPRISING IT

(75) Inventor: Laurent Nivet, Asnieres (FR)

(73) Assignee: Labinal, Montigny Le Bretonneux (FR)

( * ) Notice: Subject to any disclaimer, the term of this patent is extended or adjusted under 35 U.S.C. 154(b) by 516 days.

This patent is subject to a terminal disclaimer.

(21) Appl. No.: 09/709,421

(22) Filed: Nov. 13, 2000

(30) Foreign Application Priority Data

Nov. 8, 2000 (FR) .......................................... 00 14343

(51) Int. Cl.[7] .............................. G05D 1/02; G05D 1/10
(52) U.S. Cl. .......................... 700/302; 700/56; 700/57; 700/64; 318/568.17; 318/568.19; 318/652; 297/154; 297/161; 297/180.16
(58) Field of Search .............................. 700/56, 57, 58, 700/60, 64, 302; 318/652, 568.17, 568.19, 103, 467, 468; 297/115, 130, 154, 161, 162, 180.1, 180.15, 180.16

(56) References Cited

U.S. PATENT DOCUMENTS

| | | | | |
|---|---|---|---|---|
| 3,901,128 A | * | 8/1975 | Swogger ........................ | 91/31 |
| 3,934,928 A | | 1/1976 | Johnson | |
| 4,250,439 A | | 2/1981 | Hohmann | |
| 4,698,571 A | | 10/1987 | Mizuta et al. | |
| 4,811,226 A | * | 3/1989 | Shinohara ..................... | 701/49 |
| 5,984,349 A | * | 11/1999 | Van Voorhies ............... | 280/735 |
| 6,026,340 A | * | 2/2000 | Corrado et al. ................ | 701/47 |
| 6,055,473 A | * | 4/2000 | Zwolinski et al. ............ | 701/49 |
| 6,415,814 B1 | * | 7/2002 | Hand et al. .............. | 137/487.5 |
| 6,441,576 B1 | * | 8/2002 | Marin-Martinod et al. ....................... | 318/568.1 |
| 6,583,596 B2 | * | 6/2003 | Nivet et al. ................. | 318/626 |

FOREIGN PATENT DOCUMENTS

| | | | | |
|---|---|---|---|---|
| EP | 1 103 412 A1 | | 5/2001 | |
| EP | 1205133 A1 | * | 5/2002 | ............ B60N/2/02 |
| FR | 2736879 | | 1/1997 | |
| FR | 2 781 293 | | 1/2000 | |

OTHER PUBLICATIONS

US 2003/0057910 A1, Mar. 27, 2003, Nivet, "Actuator and Family of Actuators for a Seat and Method of Manufacturing such an Actuator".*

* cited by examiner

*Primary Examiner*—Ramesh Patel
(74) *Attorney, Agent, or Firm*—Stites & Harbison, PLLC; Ross F. Hunt, Jr.

(57) ABSTRACT

A device (22, 24) for actuating a seat element comprises an actuator (26, 28) equipped with a transducer designed to supply a crude measurement value representing the current position of the actuator.

The actuator provides for calculation of a corrected value of the current position of the actuator, from each crude measurement value supplied by the transducer, and calculation of a refining correction function.

The device also provides for processing the corrected value of the current position of the actuator.

8 Claims, 5 Drawing Sheets

DEVICE FOR ACTUATING A SEAT ELEMENT AND SEAT COMPRISING IT

The present invention relates to a device for actuating a seat element, of the type comprising an actuator equipped with a transducer designed to supply a crude measurement value representing the current position of the actuator.

In order to improve the user's comfort, nowadays many seats are equipped with electrical actuating devices making it possible to change the configuration of the seat by the displacement of moveable elements of the latter. In particular, such seats are used especially in transport vehicles, such as aircraft, ships and railroad cars.

It is customary for each seat to comprise an inclineable back articulated at one end of a sitting surface and a legrest articulated at the other end of the sitting surface. The back and the legrest are both displaceable under the control of an actuating device between a substantially vertical position and a substantially horizontal position, thus making it possible for the seat to assume several configurations. For example, among these configurations are a user reclining configuration, in which the back and the legrest are both substantially horizontal, and a sitting surface configuration in which the legrest and the back are both substantially vertical.

An actuating device is provided for the direct and independent control of each moveable element of the seat.

Moreover, many seats are equipped with devices making it possible, by means of a single command, to cause displacement both of the legrest and of the footrest, the purpose of this being to bring the seat into a predetermined configuration by means of a single command.

For each of these predetermined configurations of the seat, a predetermined target position is set for each seat element and therefore each actuator.

In order to know the position of the various seat elements at each moment and thus make it possible to manage their displacement easily, it is known to provide, in the devices for actuating the seat elements, a transducer, such as a potentiometer, making it possible to collect crude measurement values representing the current position of each actuator.

For each of the predetermined configurations of the seat which are accessible by means of a single actuating device, a predetermined target value is stored, this predetermined target value being equal to the crude measurement value logged when the seat element is in the desired target position.

Thus, in order to bring an element of the seat toward a predetermined position, the actuator is activated until the current crude measurement value supplied by the transducer is equal to the predetermined target value corresponding to the expected position for the actuator and therefore for the corresponding seat element.

Moreover, in order to avoid a moveable element of the seat colliding with an obstacle, it is known to follow the position of this moveable element and to prevent the crude measurement value supplied by the transducer from exceeding a predetermined threshold value. If the crude measurement value supplied by the transducer is equal to this predetermined threshold value, the stopping of the actuator is commanded automatically, irrespective of the command given by the passenger.

In practice, it is found that, because of the production tolerances of the seats, the production tolerances of the actuators and the mechanical and electronic inaccuracies of the transducers, the various seats installed in an aircraft do not all supply the same crude measurement value for the same position of the associated actuator and for the same position of the moveable element controlled by the actuator. Thus, for the same command given to a plurality of seats arranged side by side, the positions reached by each of the elements of this seat are not strictly identical.

When a plurality of seats are arranged side by side, such as, for example, in a row of seats of an aircraft, it is found that, when all the seats are brought into the same predetermined configuration, the positions of each of the seat elements are not strictly identical.

Thus, the visual appearance of the seats as a whole is impaired. Furthermore, since users controlling their seats in a similar way do not obtain strictly the same position for each of the elements of the seats, some of them may experience frustration.

Besides, when displacement limit values are set for some actuators, the displacement limit values of the corresponding moveable elements of the various seats are not all strictly identical, thus making it difficult to manage the zones where a displacement of the seat elements is prohibited.

The object of the invention is to provide a device for actuating a seat element, making it possible to ensure that the position reached by a seat element is actually the expected position, and, in particular, that, when a plurality of seats equipped with this device are installed side by side, they react in a similar way when they are controlled, so as to assume an identical predetermined configuration under the action of one or more actuators.

To this end, the subject of the invention is a device for actuating a seat element of the abovementioned type, characterized in that it comprises:

means for the calculation of a corrected value of the current position of the actuator, from each crude measurement value supplied by the transducer, and of a refining correction function; and means for processing said corrected value of the current position of the actuator.

According to particular embodiments, the device comprises one or more of the following characteristics:

it comprises:

means for logging at least two crude reference measurement values, each representing the position of the actuator for an identified reference position of the actuator;

means for the input of a theoretical reference value for each identified reference position of the actuator; and means for the establishment, from said at least two logged crude reference measurement values and from the corresponding theoretical reference values, of said refining correction function for calculating the corrected value of the current position of the actuator, from each crude measurement value supplied by the transducer; and said means for the establishment of the refining correction function are designed to establish said refining correction function from only two crude reference measurement values; and said processing means comprising means for the continuous comparison of said corrected value of the current position of the actuator with at least one predetermined threshold value, and pilot control means designed to generate a pilot control command as a function of the result of the or each comparison.

The invention also relates to a seat comprising at least one moveable element and at least one actuating device, as defined above, associated mechanically with a seat element for the displacement of the latter.

According to particular embodiments, the seat comprises one or more of the following characteristics:

it comprises at least one moveable element associated mechanically with an actuating device, as defined above, it comprises a device designed to bring the seat into at least one predetermined configuration under the action of a single command supplied by the user, and the or each predetermined threshold value represents the position of the associated actuator in a predetermined configuration of the seat.

Finally, the invention relates to a set of seats comprising at least two seats of similar structure, as defined above.

According to a particular embodiment, said seats are arranged side by side.

The invention will be understood better from a reading of the following description given purely by way of example and made with reference to the drawings in which.

Figure 1:
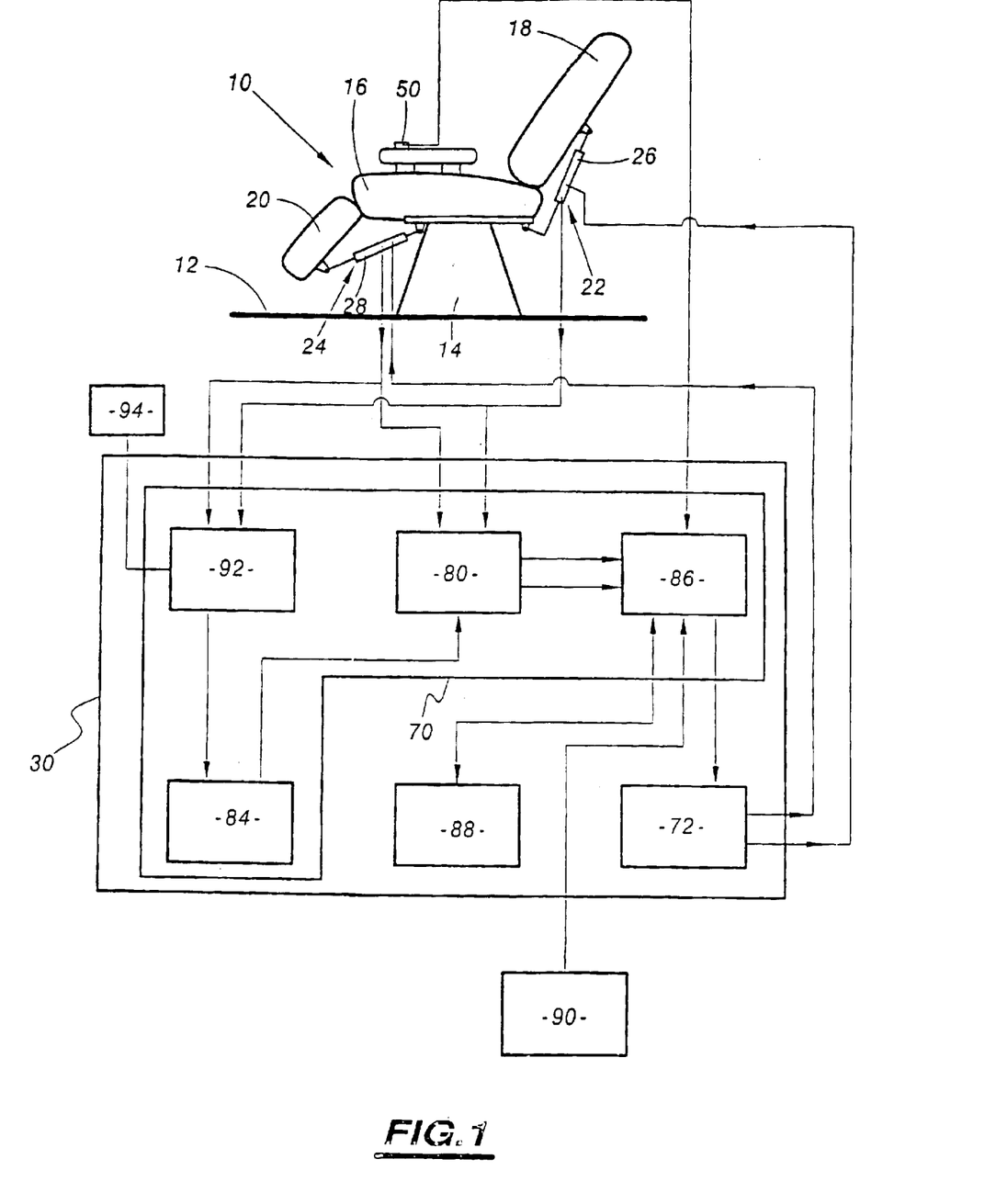
FIG. 1 is a diagrammatic side view of a seat equipped with two actuating devices according to the invention.

The seat 10 shown in FIG. 1 is a passenger seat of an aircraft. This seat is fastened to the floor 12 of the aircraft.

The seat 10 comprises a mounting 14 which is fixed to the floor 12 and on which a substantially horizontal sitting surface 16 rests. Articulated at one end of the sitting surface is a back 18 displaceable between a substantially vertical position and a substantially horizontal position in which it prolongs the sitting surface 16.

Articulated at the other end of the sitting surface 16 is a legrest 20 displaceable between a substantially vertical folded-down position below the sitting surface 16 and a substantially horizontal extended position in the prolongation of the sitting surface 16.

A first actuating device 22 is mounted between the sitting surface 16 and the back 18, in order to ensure a displacement of the latter between its vertical position and its horizontal position.

Likewise, a second actuating device 24 is mounted between the sitting surface 16 and the legrest 20, in order to ensure a displacement of the latter between its folded-down position and its extended position.

Each actuating device 22, 24 comprises an actual actuator designated respectively by 26 and 28. These actuators are fed with electrical current from a common control unit 30 forming part of the actuating devices of each element of the seat. This control unit 30 is connected separately to each of the actuators 26, 28 in order to ensure that they are pilot-controlled independently.

The actuators 26 and 28 have substantially the same structure. One of them is illustrated diagrammatically in FIG. 2.

Figure 2:
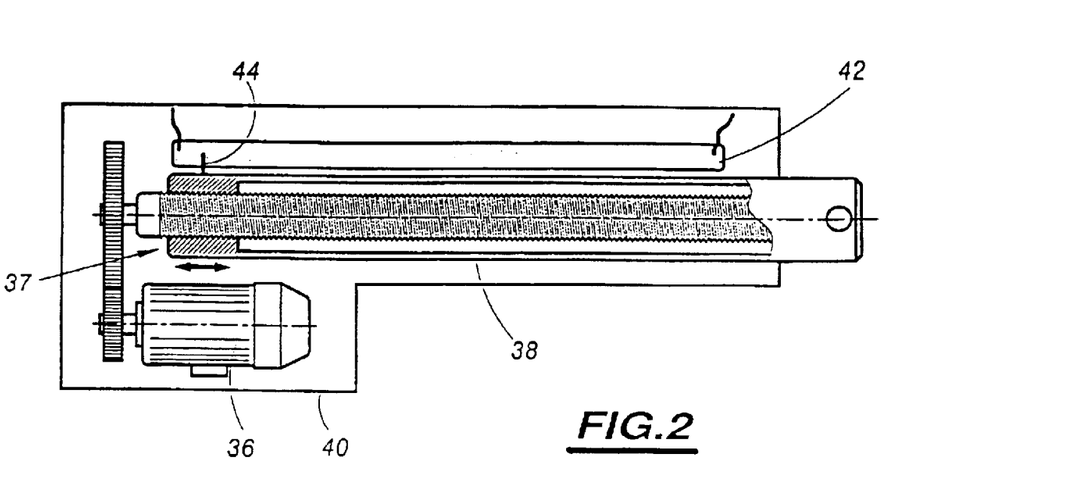
FIG. 2 is a diagrammatic view of an actuator of an actuating device according to the invention.

Thus, an actuator comprises a geared motor assembly 36, which, as is known per se, is associated, for example with the aid of a screw/nut arrangement 37, with a rod 38 moveable in translational motion relative to a housing 14 in which the geared motor assembly is fastened.

Furthermore, a potentiometer 42 or any other suitable type of transducer is fastened to the housing 40. A slider 44 of the potentiometer is fixed to one end of the rod 38 of the actuator. The potentiometer 42 is connected to the control unit 30. Thus, the potentiometer 42 allows the control unit 30 to collect continuously a crude measurement value representing the current position of the actuator. This crude measurement value is the resistance value of the potentiometer in the case in question.

A keypad 50 (FIG. 1) or any other control member is fixed to the seat, in order to enable the user to control each actuator of the seat separately and directly. The keypad also makes it possible to reach one of three predetermined configurations of the seat by means of a single command acting on a plurality of actuators. The number of separate configurations may be different from three, for example equal to two or greater than four. For this purpose, in the example in question, the keypad comprises three keys, each associated with a predetermined configuration. These configurations are a catering configuration, a landing configuration and a reclining configuration.

Another predetermined position may be defined directly by the user and is accessible by means of a specific key.

In the catering configuration, the legrest 20 and the back 18 are both in predetermined positions, in which they are strictly vertical and define an angle of 90° to the plane of the sitting surface.

In the landing configuration, the back 18 and the legrest 20 are in predetermined positions such that the back 18 defines an angle of approximately 20° to the plane of the sitting surface, while the legrest 20 defines an angle of approximately 10° to the vertical.

In the reclining configuration, the back 18 and the legrest 20 are in predetermined positions, in which they prolong the sitting surface 16 and thus extend substantially in the plane of the latter.

In order to ensure the control of the seat, the control unit 30 comprises a central information processing unit 70, to which the keypad 50 is connected. Moreover, the potentiometers of the two actuators 26 and 28 are likewise connected to this central information processing unit 70, in order to supply continuously to the latter, for each actuator, a crude measurement value representing the current position of the actuator.

The central information processing unit 70 is connected to a unit 72 for feeding the actuators 26 and 28. The unit 72 is designed to feed electrical current to the actuators 26 and 28 as a function of control commands received from the central information processing unit 70. In particular, the electrical current supplied by the feed unit 72 is designed to ensure a satisfactory speed of the actuators and a current having a form allowing the actuator to be displaced in the desired direction.

The information processing unit 70 is designed to control the seat from the crude measurement values received from the various transducers installed in the actuators of the seat.

However, according to the invention, the crude measurement values obtained from the transducers are corrected in order to take account of the production tolerances of the seat and of the inaccuracies of the transducers, before being processed and utilized within the information processing unit 70.

For this purpose, the central information processing unit 70 comprises means 80 designed to ensure a correction of the crude measurement values obtained from the transducers installed in the actuators 26 and 28. These correction means 80 are designed to correct the crude measurement values as a function of correction information and, in particular, by the implementation of a refining correction function stored in a memory 84.

Furthermore, the processing unit 70 comprises pilot control means designated by the general reference 86. These pilot control means receive from the correction means 80 corrected values of the current positions of each actuator which are calculated from the crude measurement values supplied by the transducers.

The pilot control means 86 are designed to address control commands to the feed unit 72.

The control unit 30 comprises, furthermore, a memory 88, to which the pilot control means 86 are connected. Stored in the memory 88 are predetermined threshold values, designated in general by $P_{pred}$, corresponding to the target positions to be assumed by the seat elements when the seat is being changed toward a predetermined configuration.

Thus, for each seat element, a plurality of predetermined threshold values are stored. Each predetermined threshold value corresponds to a target position for a seat element, this target position being defined for a predetermined configuration of the seat.

Moreover, two other predetermined threshold values, designated by $P_{min}$ and $P_{max}$, are stored for each actuator in the memory 88. These predetermined threshold values constitute deflection limit values and correspond to the end positions permitted for the actuator in the seat and therefore define the range of deflection of said actuator for the seat in question.

The memory 88 is rewriteable under the control of the pilot control means 86 of the central unit. In particular, the central information processing unit 70 is designed, when a suitable control command obtained, for example, from a removable accessory keypad 90, is received, for storing in the memory 88 the predetermined threshold values for each actuator.

The pilot control means 86 are designed to ensure comparisons between the corrected current positions received from the correction means 80 and the predetermined threshold values stored in the memory 88.

In order to ensure that the refining correction function stored in the memory 84 is determined and stored, the central information processing unit 70 comprises calibration means 92 associated with information input means 94. These information input means are advantageously removable. They consist, for example, of a keypad, especially a keypad of a portable computer, making it possible to address information logging commands and theoretical reference values to the calibration means 92.

The calibration means 92 are connected to each of the transducers 42, in order to receive continuously the crude measurement values supplied by these transducers.

Furthermore, the calibration means 94 are connected to the memory 84 for the storage of a correction function prepared by the calibration means for each of the actuators of the seat.

In practice, the central information processing unit 70 is formed from a microprocessor associated with a suitable operating environment, comprising especially means for storing a set of programs implemented by the microprocessor, in order to ensure the functions of the correction means 80, of the pilot control means 86 and of the calibration means 92.

Figure 3:
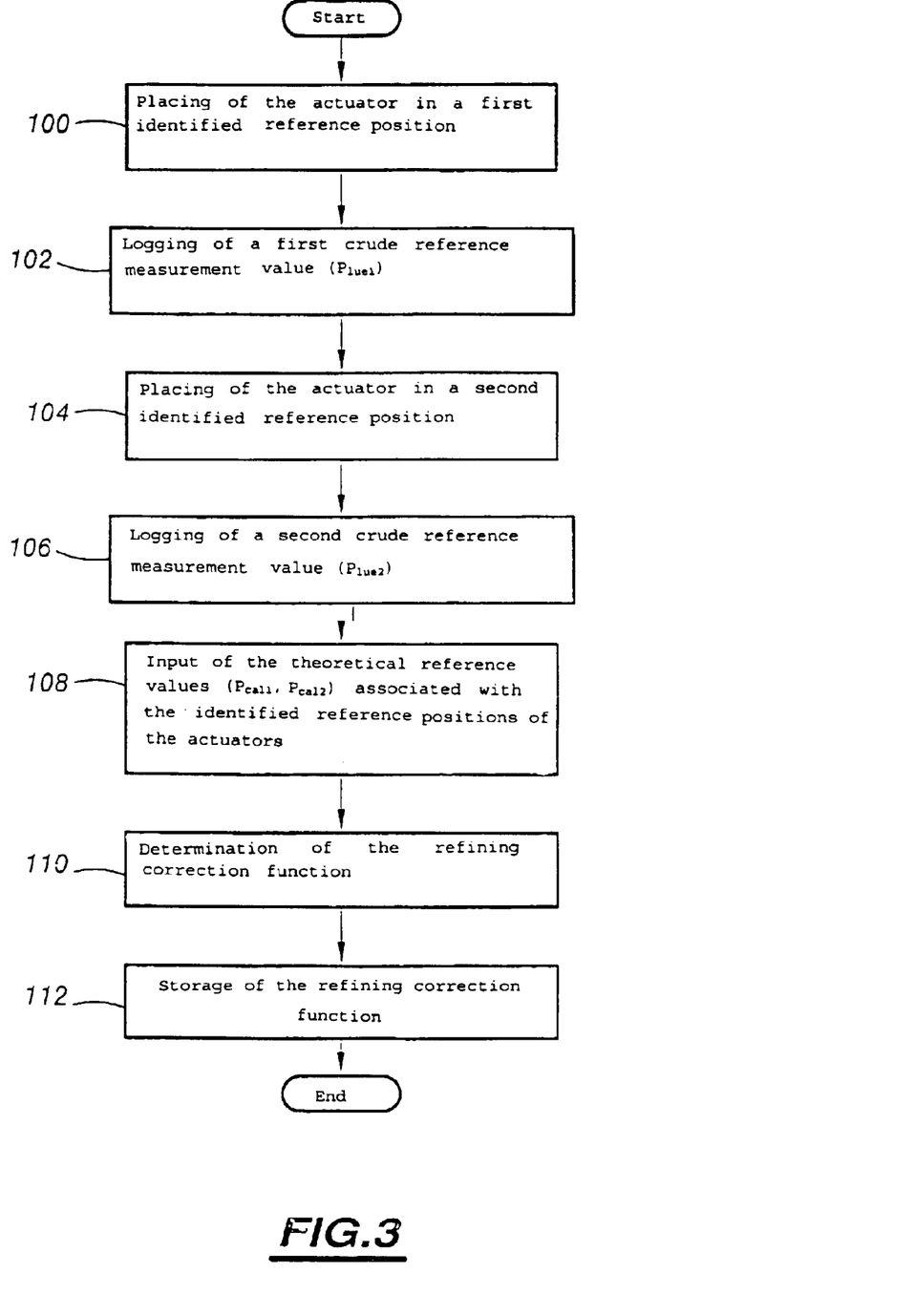
FIG. 3 is a flowchart illustrating the process of calibrating an actuating device according to the invention.

In order to determine and store each refining correction function, the calibration algorithm described in FIG. 3 is utilized. This algorithm is described in terms of the calibration of an actuator controlling a moveable seat element. However, a similar algorithm is utilized for calibrating each actuator.

In step 100, the element controlled by the actuator is brought manually into a first identified reference position. In step 102, by the depression of a predetermined key of the information input means 94, the first crude reference measurement value, designated by $P_{lue1}$, is logged by the calibration means 92. This value is stored temporarily.

The seat element is subsequently brought manually into a second identified reference position in step 104.

In step 106, by the depression of a predetermined key of the information input means 94, a second crude reference measurement value, designated by $P_{lue2}$, representing the position of the actuator in its second identified reference position, is recorded by the calibration means 92.

In step 108, theoretical reference values, designated by $P_{cal1}$ and $P_{cal2}$, associated with the first and second identified reference positions of the actuator which were under consideration in steps 100 and 104, are input into the calibration means 92. These identified values are acquired from the information input means 94, for example by means of the keypad.

These theoretical values are equal to or proportional to the crude values which the potentiometer of an actuator assumed to be ideal should supply when the actuator is in its first identified reference position and in its second identified reference position.

Finally, in step 110, a refining correction function is established from the logged crude reference measurement values $P_{lue1}$ and $P_{lue2}$ and from the theoretical reference values $P_{cal1}$ and $P_{cal2}$.

Figure 4:
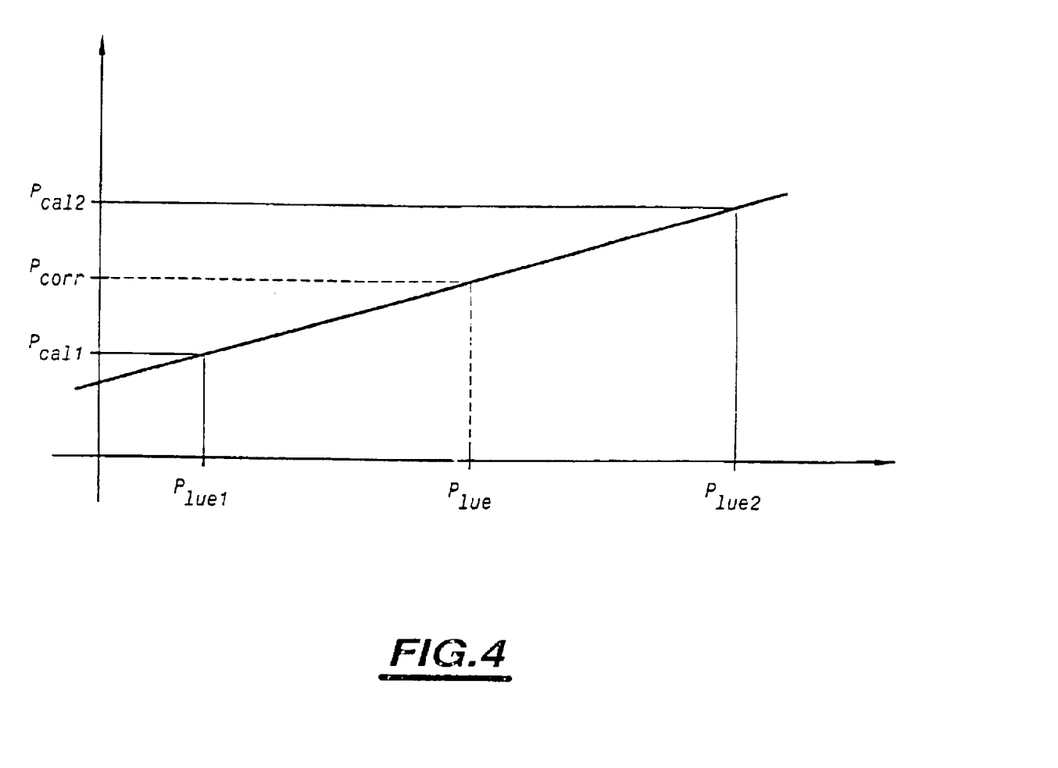
FIG. 4 is a curve illustrating the calculations carried out during the calibration process and during the calculation of corrected position values.

As illustrated in FIG. 4, the calculated refining function corresponds to the equation of the straight line passing through the abscissa points $(P_{lue1}, P_{cal1})$ and $(P_{lue2}, P_{cal2})$ in a reference system where the crude measurement values are represented on the abscissa and the theoretical values on the ordinate.

The correction function corresponding to the equation of the abovementioned straight line is given by the formula: $P_{corr} = P_{lue} - \{a(P_{lue} - P_{cal1}) + b\}$, where: $P_{corr}$ is the corrected value corresponding to the crude value which ought to have been obtained with an ideal actuator, and $P_{lue}$ is the crude current measurement value actually logged.

In the abovementioned correction formula, b is given by the formula:

$$b = P_{lue1} - P_{cal1}, \text{ and}$$

a is given by the formula:

$$a\ ((P_{lue2} - P_{cal2}) - b)/(P_{lue2} - P_{lue1}).$$

b corresponds to the initial offset of the actual stroke of the actuator and of the theoretical stroke of an ideal actuator, while a corresponds to the difference in slope between the characteristic slope of the actuator and the theoretical slope of an ideal actuator.

In step 102, the calculated refining function making it possible to determine a corrected value of the current position of the actuator from the crude measurement value supplied by the transducer is stored in the memory 84.

Such a calibration algorithm from two logged values is utilized for each actuator of each seat of a vehicle, such as an aircraft.

Alternatively, all the actuators of the same seat may be calibrated simultaneously. For this purpose, each seat element is brought manually into a first identified reference position. A first crude reference measurement value is then logged for each actuator. Each seat element is subsequently brought manually into a second identified reference position. A second crude reference measurement value is then logged for each seat element. Refining correction functions are calculated for each actuator as a function of the first and second crude reference measurement values.

Advantageously, when a plurality of identical seats are arranged in the same vehicle, and especially when a plurality of identical seats are arranged side by side, the identified reference positions used for calibration are the same for the respective actuators of each of the seats. Moreover, the theoretical reference values of each of the control devices of each of the seats for the corresponding actuators are advantageously set at identical values.

Thus, for programming the pilot control means 86 of the seats, the same algorithms and the same values can be used for each of the seats. In particular, the predetermined threshold values stored in the memories 88 of each of the seats can be assumed to be identical, with the certainty that the same behavior of the seats will be obtained.

This initial calibration phase is utilized only during the mounting of the seats. The correction functions stored in the memory 84 are then preserved for the entire service life of the seat. However, these functions may be modified, if necessary, in order to define a new refining calibration function, for example after the replacement or repair of an actuator or after a change of a seat element.

Outside this initial calibration phase, the control unit 30 is designed to implement a set of control algorithms of each actuator, in order either to displace a seat element as a result of a direct command from the user or to displace this seat element into a predetermined target position associated with a predetermined configuration of the seat required by the user.

Tests are conducted continuously in order to examine the depression of a key of the keypad 50 corresponding to a direct control of a seat element or to a control of the seat toward a predetermined configuration.

Figure 5:
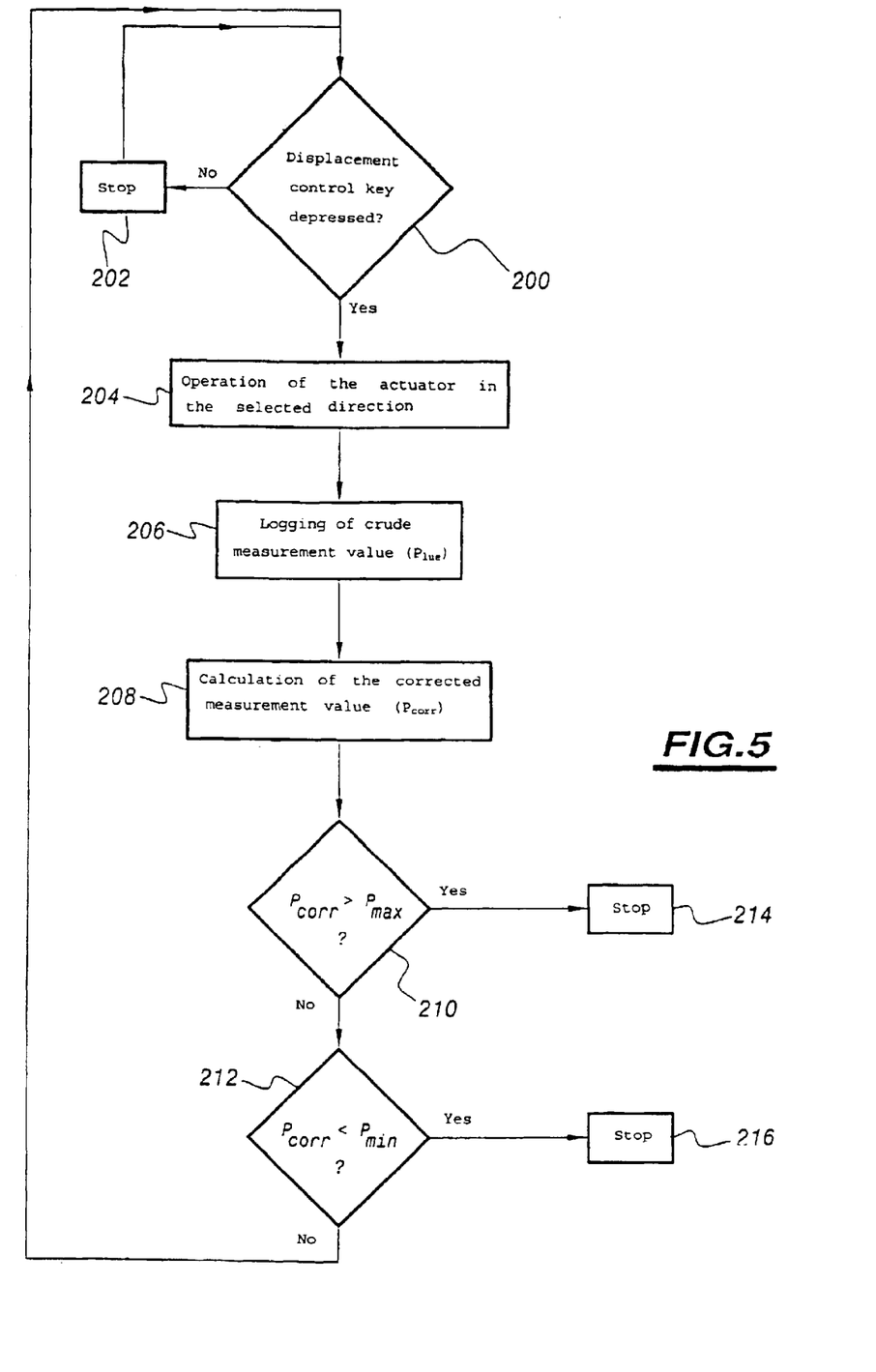
FIGS. 5 and 6 are two flowcharts explaining the functioning of an actuating device according to the invention.
Figure 6:
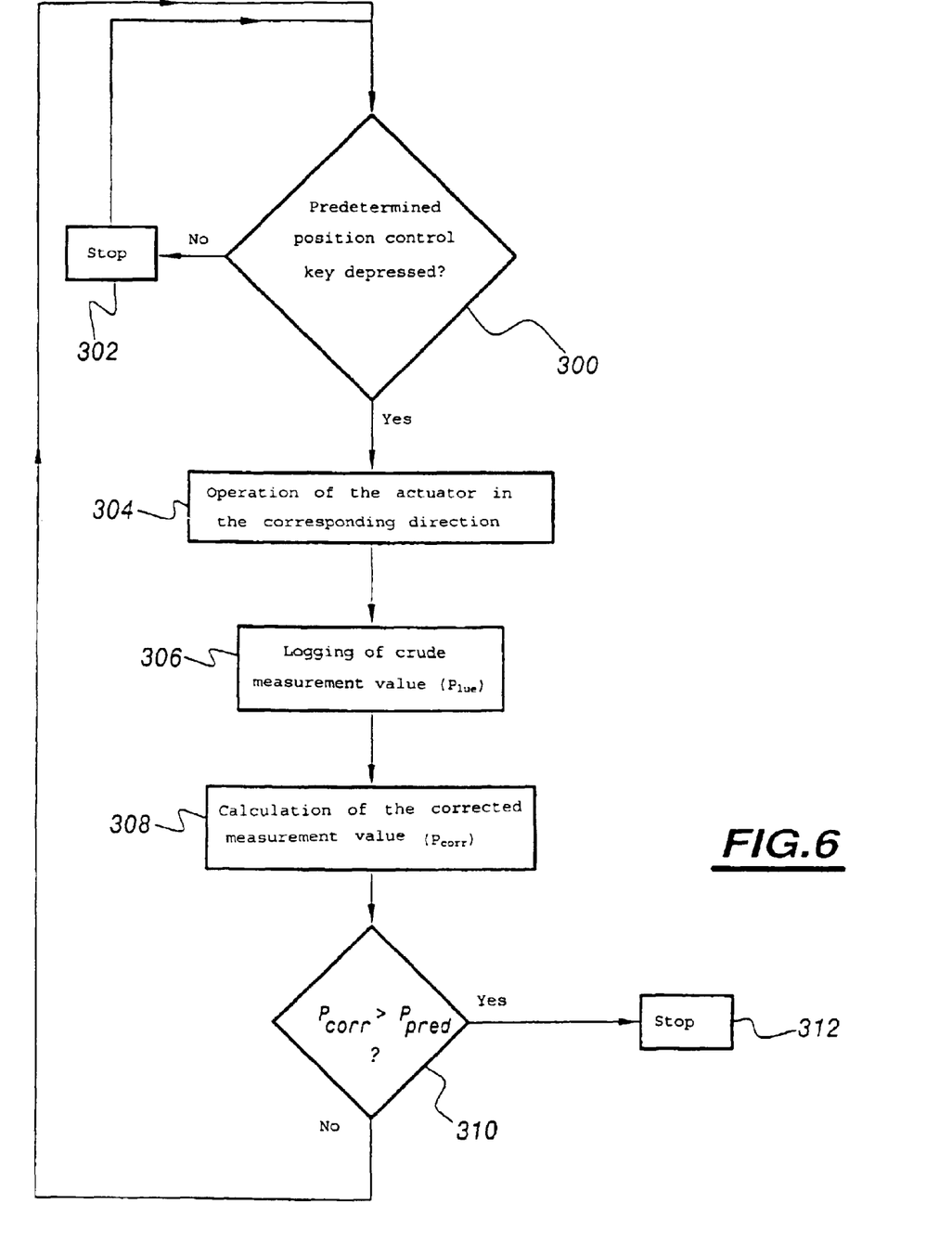

Two examples of such algorithms are given in FIGS. 5 and 6.

FIG. 5 illustrates the algorithm making it possible to displace an actuator, for example the actuator 28 acting on the legrest 20.

The test is utilized, in step 200, to determine whether the key appropriate for the direct control of the actuator in question has been depressed in one direction or another. If this is not so, the actuator is kept stopped in step 202 or the actuator is stopped if it is in motion.

If, in step 200, the depression of a displacement control key is detected, the corresponding actuator is activated in the selected direction, in step 204.

In step 206, a log of the crude measurement value $P_{lue}$ is carried out by means of the control unit 30. This crude value corresponds to the value of the resistance of the potentiometer installed on the actuator in question.

In step 208, a corrected measurement value $P_{corr}$ is calculated by the correction means 80 from the logged crude measurement value and from the refining correction function stored in the memory 84.

In steps 210 and 212, the corrected measurement value $P_{corr}$ is compared by the pilot control means 86 with the displacement limit values of the actuator, which are designated by $P_{max}$ and $P_{min}$.

If the corrected measurement value $P_{corr}$ is higher than the value $P_{max}$ or lower than the value $P_{min}$, the stopping of the actuator is commanded in one of steps 214 and 216. In fact, if one of the tests conducted in steps 210 and 212 is verified, the actuator is at the end of its stroke and it must be stopped.

At the end of test step 212, step 200 is implemented once again, in order to ensure a looping of the sequence of steps described above.

It will be appreciated that, with the implementation of such an algorithm, since the tests conducted in steps 210 and 212 are not carried out on the crude measurement values $P_{lue}$, but on the corrected measurement values $P_{corr}$, the implementation of the algorithm does not depend on the production tolerances of the seat and of the actuator or on the inaccuracies of the transducer incorporated in the actuator. In fact, the influence of these tolerances and inaccuracies is eliminated due to the prior calibration of the control device, this calibration making it possible to carry out tests on values corresponding to theoretical values which would have been found with an ideal actuator.

FIG. 6 illustrates another algorithm utilized by a control device according to the invention. This algorithm corresponds to the case where a seat is controlled toward a predetermined configuration.

In step 300, a test is conducted to detect the depression of a predetermined configuration control key. When such a control key is not depressed, the actuator is kept stopped in step 302 or, if it is in operation, its stopping is commanded during this step.

When the depression of a predetermined configuration control key is detected, the associated actuator is put into operation, in step 304, in the direction corresponding to the predetermined target position of the seat element associated with the desired configuration.

In step 306, a log of the crude measurement value $P_{lue}$ is carried out by means of the control unit 30.

A calculation of the corrected measurement value $P_{corr}$ is carried out, in step 308, by the correction means 80 from the crude measurement value $P_{lue}$ and from the stored refining correction function.

This corrected measurement value $P_{corr}$ is supplied to the pilot control means 86 which, in step 310, conduct a test aimed at comparing the corrected measurement value $P_{corr}$ with a predetermined threshold value $P_{pred}$ corresponding to the predetermined target position of the seat element.

If the corrected measurement value $P_{corr}$ is higher (or lower, depending on the direction of displacement) than the predetermined threshold value $P_{pred}$, the stopping of the actuator is commanded in step 312. If this is not so, step 300 is carried out once again, so as to implement the looping of the sequence of steps which were described above.

It will be appreciated that, with an algorithm such as defined above, the predetermined threshold value $P_{pred}$ can be independent of the production tolerances of the seat and of the inaccuracies of the transducer used in the actuator. In fact, the corrected measurement values compared with this predetermined threshold value are themselves independent of the tolerances and inaccuracies of the transducer on account of the prior calibration of the control device.

Thus, the same predetermined threshold values can be used for each of the adjacent seats, with a certainty that the implementation of the abovementioned identical algorithms in the various seats will result in the corresponding seat elements of the various seats being brought into strictly identical positions when identical commands are given to these various seats.

In the example described above, the refining correction function of each actuator is determined from only two points.

Alternatively, it is calculated from more than two points, for example by means of an algorithm of the least squares.

What is claimed is:

1. A device for actuating a seat element, said device comprising:
   an actuator including a transducer for supplying a crude measurement value ($P_{lue}$) representing a current position of the actuator, means calculating a corrected value ($P_{corr}$) of the current position of the actuator, from each crude measurement value ($P_{lue}$) supplied by the transducer, and calculating a refining correction function; and processing means for processing said corrected value ($P_{corr}$) of the current position of the actuator.

2. A device according to claim 1, further comprising:

means for logging at least two crude reference measurement values ($P_{lue1}$, $P_{lue2}$) each representing a position of the actuator for an identified reference position of the actuator;

means for inputting a theoretical reference value ($P_{cal1}$, $P_{cal2}$) for each said identified reference position of the actuator; and means for the establishing, from said at least two logged crude reference measurement values ($P_{lue1}$, $P_{lue2}$) and from corresponding theoretical reference values ($P_{cal1}$, $P_{cal2}$), said refining correction function for calculating the corrected value ($P_{corr}$) of the current position of the actuator, from each crude measurement value ($P_{lue}$) supplied by the transducer.

3. A device according to claim 2, wherein said means for establishing the refining correction function establishes said refining correction function from only two crude reference measurement values.

4. A device according to claim 1, wherein said processing means comprises means for continuously comparing said corrected value ($P_{corr}$) of the current position of the actuator with at least one predetermined threshold value, and pilot control means for generating a pilot control command as a function of said comparing.

5. A seat comprising at least one moveable seat element, and at least one actuating device comprising:

an actuator including a transducer for supplying a crude measurement value ($P_{lue}$) representing a current position of the actuator, means for calculating a corrected value ($P_{corr}$) of the current position of the actuator, from each crude measurement value ($P_{lue}$) supplied by the transducer, and calculating a refining correction function; and processing means for processing said corrected value ($P_{corr}$) of the current position of the actuator, said at least one actuating device being associated mechanically with the at least one seat element for providing displacement of the at least one seat element.

6. A seat according to claim 5, wherein the processing means of said at least one actuating device comprises means for continuously comparing said corrected value ($P_{corr}$) of the current position of the actuator with at least one predetermined threshold value, and pilot control means for generating a pilot control command as a function of said comparing and the seat further comprises a device for bringing the seat into at least one predetermined configuration responsive to a single command supplied by a user, the at least one predetermined threshold value representing a position of the associated actuator in a predetermined configuration of the seat.

7. A set of seats comprising at least two seats of a similar structure each comprising at least one moveable seat element and at least one actuating device comprising:

an actuator including a transducer for supplying a crude measurement value ($P_{lue}$) representing a current position of the actuator, means for calculating a corrected value ($P_{corr}$) of the current position of the actuator, from each crude measurement value ($P_{lue}$) supplied by the transducer, and calculating a refining correction function; and processing means for processing said corrected value ($P_{corr}$) of the current position of the actuator, said at least one actuating device being associated mechanically with the at least one seat element of each of said at least two seats for providing displacement of the at least one seat element, and said actuating device further comprising:

means for logging at least two crude reference measurement values ($P_{lue1}$, $P_{lue2}$) each representing a position of the actuator for an identified reference position of the actuator;

means for inputting a theoretical reference value ($P_{cal1}$, $P_{cal2}$) for each said identified reference position of the actuator; and means for establishing, from said at least two logged crude reference measurement values ($P_{lue1}$, $P_{lue2}$) and from corresponding theoretical reference values ($P_{cal1}$, $P_{cal2}$), said refining correction function for calculating the corrected value ($P_{corr}$) of the current position of the actuator, from each crude measurement value ($P_{lue}$) supplied by the transducer, the reference positions of each of the actuators of the respective actuating devices of each of the seats being identical.

8. A set of seats according to claim 7, wherein said seats are arranged side by side.

* * * * *